Sept. 23, 1969  J. L. STEWART  3,469,034

NEURAL-LIKE ANALYZING SYSTEM

Filed May 23, 1966  3 Sheets-Sheet 1

INVENTOR.
JOHN L. STEWART
BY
Meyers & Peterson
ATTORNEYS

Sept. 23, 1969  J. L. STEWART  3,469,034
NEURAL-LIKE ANALYZING SYSTEM
Filed May 23, 1966  3 Sheets-Sheet 2

JOHN L. STEWART
BY
Meyers & Peterson
ATTORNEYS

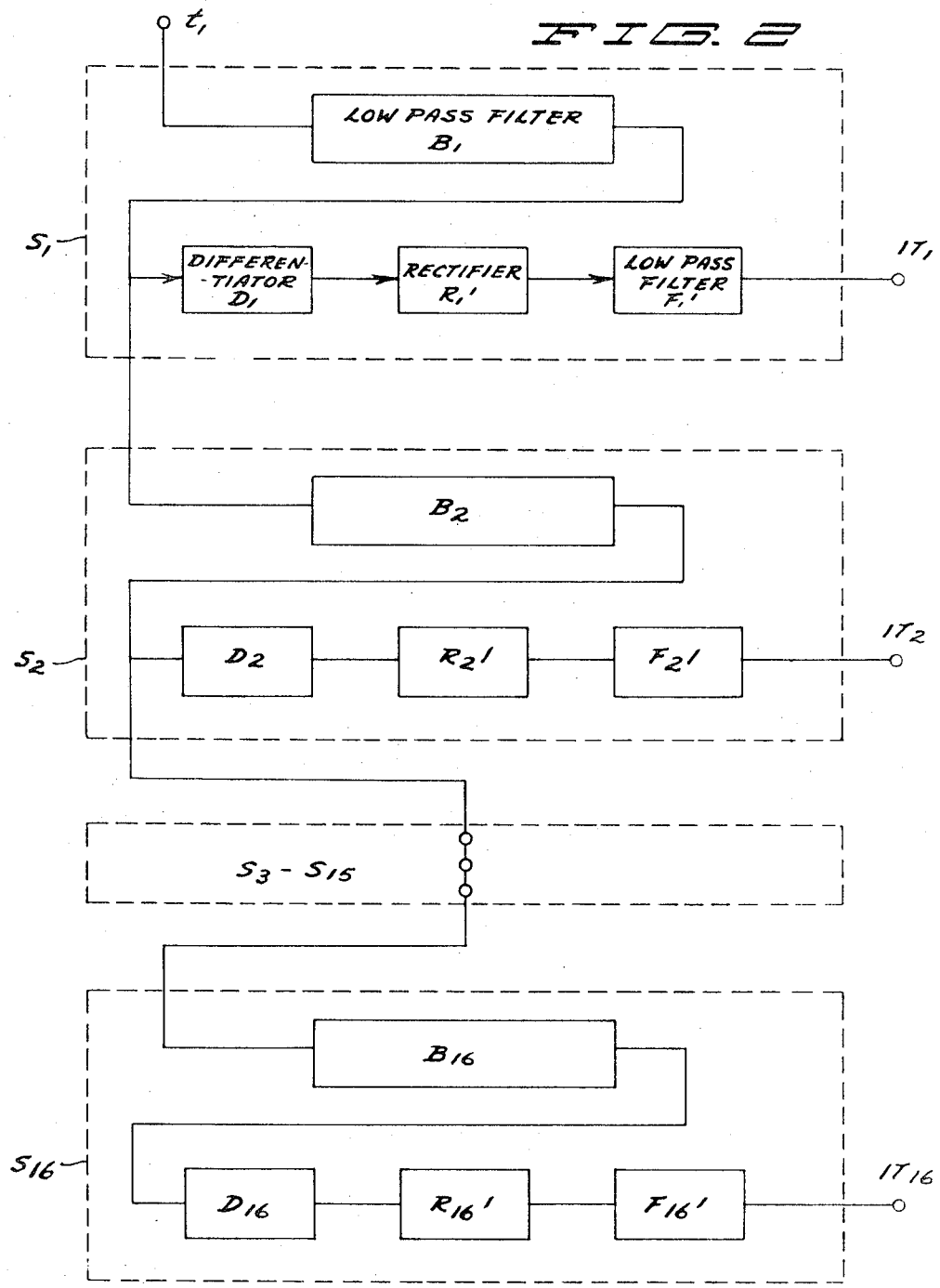

United States Patent Office 3,469,034
Patented Sept. 23, 1969

3,469,034
NEURAL-LIKE ANALYZING SYSTEM
John L. Stewart, Menlo Park, Calif., assignor to Santa Rita Technology, Inc., Menlo Park, Calif., a corporation of Arizona
Filed May 23, 1966, Ser. No. 552,158
Int. Cl. H04m 1/24; H04b 1/66
U.S. Cl. 179—1    8 Claims

ABSTRACT OF THE DISCLOSURE

A system for analyzing the frequency content and distribution of audio signals. A cascade of low-pass filter sections. Included in each filter section is an amplifier, a differentiating network, and a rectifier. Each of the amplifiers has a distinct gain or scale factor and the scale factor of each amplifier increases along the cascade of the filter sections to provide signals of consistent magnitude at each point along the cascaded filter sections. A commutator and an oscilloscope arranged to sequentially display the amplified output of each such filter section.

---

This invention relates generally to waveform analyzers, and pertains more particularly to a neural-like analyzing system.

Considerable effort is currently being devoted to the study of sound and those problems related to or associated therewith. This is particularly true with respect to the study and processing of speech patterns. A broad object of my invention is to provide an analyzing system that will assist in the study of neural-like waveforms which are relatively complex. More specifically, an aim of the invention is to provide a neural-like analyzing system that effectively removes a vast amount of redundant information from a complex wave signal, thereby forwarding the essential data for either observation or processing. For instance, I am a co-inventor with William F. Caldwell and Ewald Glaesser of an invention described in a patent application filed Dec. 19, 1962, Ser. No. 245,697, for "Electronic Analog Ear," now Patent No. 3,294,909; and I am also the inventor of an invention described in a patent application filed July 12, 1965, Ser. No. 471,074, for "Method and System of Analyzing the Inner Ear"; my present invention will find especial utility as an accessory or adjunct to the inventions there described and claimed.

Another object of the present invention is to provide an analyzing system that is extremely effective in connection with the study or processing of transient waveforms that have proved particularly troublesome in the past with respect to an accurate understanding thereof.

A further object of the invention is to provide a neural-like analyzing system that is composed of conventional components which are of relatively low cost, thereby contributing to an over-all inexpensive system.

Briefly, my invention in one of its forms comprises a cascade of low-pass filter sections with responses derived from each station via a differentiating network where the bandwidth of the response station diminishes along the array while the over-all magnitude scale factor increases correspondingly. The several responses are nonlinearily processed so that monopolar signals obtain, where each such signal is further low-pass filtered to no more than a few cycles per second. The final result produces a slowly varying spatial pattern that varies in time with the stimulus. The signals can be also utilized directly without being displayed, an example of such signal processing being in connection with speech-to-machine transformation. Thus, when employed in conjunction with an electronic analog ear, such as disclosed in the aforementioned patent applications, my neural analyzer, more precisely a group of such analyzers, converts the slope or time rate of change of the envelope function of the neural signal at various points or response stations spaced axially along the ear to signals that can be readily studied or processed. Whether one such analyzer is employed or a group of such analyzers is utilized, the signals interpreted thereby are devoid of frequency components contained in the original waveform.

These and other objects and advantages of my invention will more fully appear from the following description, made in connection with the accompanying drawings, wherein like reference character refer to the same or similar parts throughout the several views and in which:

FIGURE 2 is a block diagram representation for one form of the neural analyzers shown in FIGURE 1.

Figure 1:
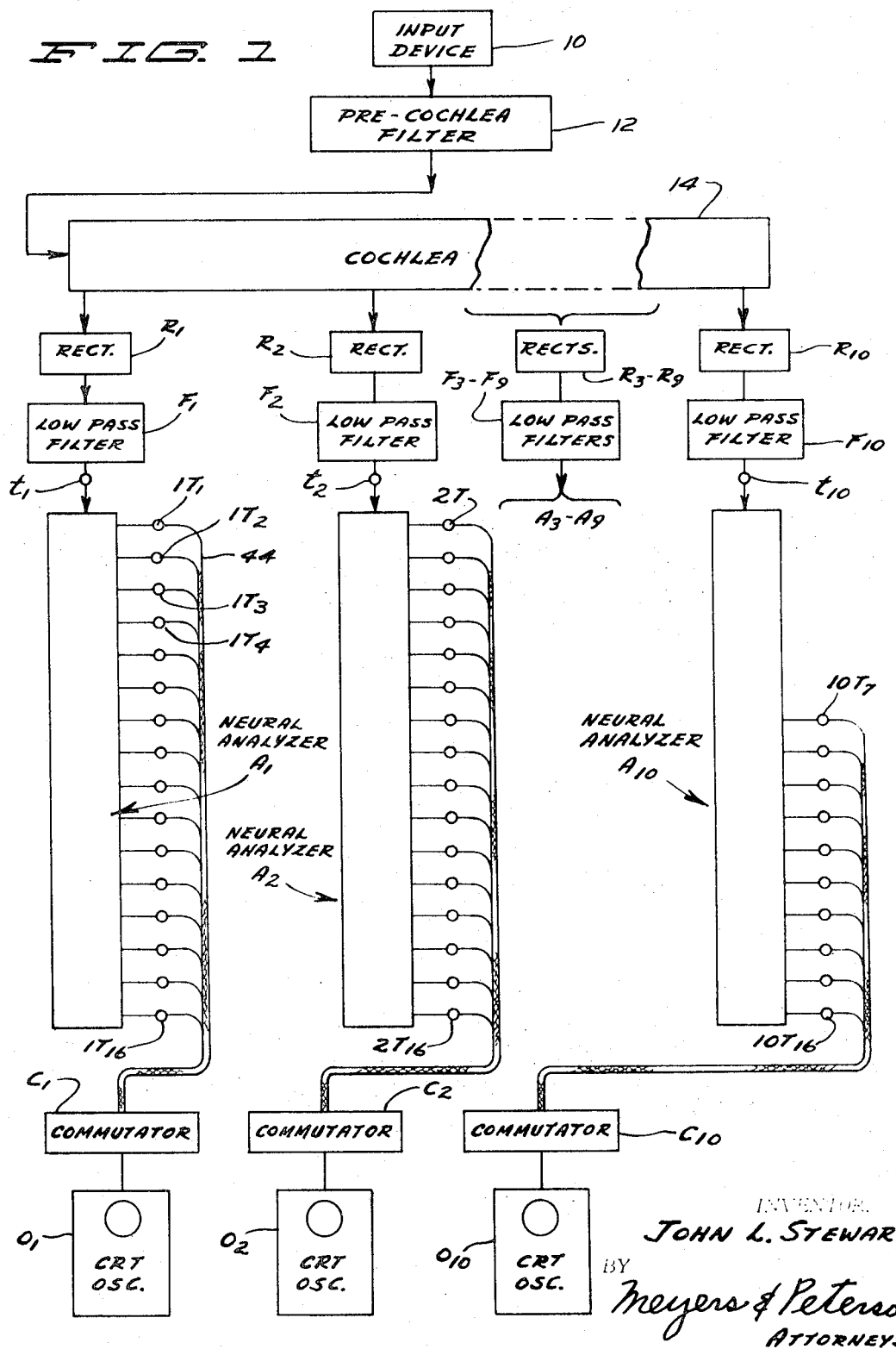
FIGURE 1 is a block diagram illustrating my invention when used in conjunction with an electronic simultation of the cochlea.

Referring now in detail to FIGURE 1, an input device 10, such as a microphone or tape deck, serves as the means for delivering an appropriate electrical signal that has been transduced or converted from the sound to be analyzed in the illustrative situation. Preferably, a pre-cochlea filter 12 is utilized for the purpose of limiting the upper frequency to that characteristic of the human ear in emulation of the outer and middle parts of the ear. The output from the filter 12 is delivered to the input end of the cochlea labeled 14 which is more fully described in my co-pending applications. However, it is to be recognized for the purpose of understanding what is involved in practicing the present invention that the cochlea 14 includes a preferred number of impedance sections which provide response stations along a line representative of the axis of the basilar membrane of the inner ear.

Assuming that waveform functions in the cochlea 14 are to be limited to 440 cycles per second, the various response stations would have connected thereto individual rectifiers labeled $R_1$–$R_{10}$, the particular number being arbitrarily selected; actually, as the description progresses, it will become more readily understood that a lesser number of such rectifiers could be used when a lesser number of yet to be described neural analyzers are resorted to and the present invention makes it such that a relatively few analyzers can be employed without unduly sacrificing or reducing the information to be studied or processed. Having selected 440 cycles per second as the upper limit of the signals to be handled, a plurality of low-pass filters $F_1$–$F_{10}$ are connected to the various rectifiers $R_1$–$R_{10}$. These filters have an upper frequency limit at least equal to the selected frequency and preferably 50 or so cycles per second thereabove. The outputs from the low-pass filters $F_1$–$F_{10}$ are connected to individual terminals labeled $t_1$–$t_{10}$. If desired, the signals appearing at the terminals $t_1$–$t_{10}$ can be utilized for study purposes without further processing. However, it is intended that the terminals $t_1$–$t_{10}$ each be connected to a neural analyzer. Since there have been 10 response stations selected, there would be 10 neural analyzers $A_1$–$A_{10}$. In the specific example herein being presented, the neural analyzers $A_1$–$A_{10}$ can be identical with each other or the ones toward the right can have a decreasing number of stages as will become more apparent after a description of the neural analyzer $A_1$. The signals applied to the neural analyzer in any event will possess but a single polarity as a result of rectification.

FIGURE 2 is a general block diagram of neural analyzer $A_1$ and it will be understood that the other neural analyzers $A_2$ to $A_{10}$ are similarly constituted. As shown, neural analyzer $A_1$ has a plurality of stages $S_1$–$S_{16}$.

Each of the stages of neural analyzer $A_1$ contains a low pass filter having an appropriate scale factor or gain, these filters being designated by the characters $B_1$, $B_2$ ... $B_{16}$ and being connected to each other in cascade. The respective outputs of each fo the low pass filters $B_1$–$B_{16}$ are operated upon by circuitry adapted to perform a differentiation and rectification thereof so as to derive a signal at each stage which is proportional to the time rate of change of positive going portions of signals reaching that stage. This circuitry is represented in FIGURE 2 by differentiators $D_1$–$D_{16}$ and the rectifiers $R_1'$–$R_{16}'$. The respective rectified derivative signals are then low pass filtered in filters $F_1'$–$F_{16}'$ before being applied to the output terminals $1T_1$–$1T_{16}$.

The cascade of low-pass filters $B_1$–$B_{16}$ is so designed that cut-off frequencies decrease logarithmically (in equal ratios) according to the schedule in the following table:

TABLE I

| Stage Number: | Bandwidth (c.p.s.) | Accumulated Scale Factor (db) |
| --- | --- | --- |
| $S_1$ | 440 | 3 |
| $S_2$ | 290 | 6 |
| $S_3$ | 195 | 9 |
| $S_4$ | 130 | 12 |
| $S_5$ | 86.5 | 15 |
| $S_6$ | 57.5 | 18 |
| $S_7$ | 38.4 | 21 |
| $S_8$ | 25.5 | 24 |
| $S_9$ | 17.0 | 27 |
| $S_{10}$ | 11.4 | 30 |
| $S_{11}$ | 7.6 | 33 |
| $S_{12}$ | 5.06 | 36 |
| $S_{13}$ | 3.37 | 39 |
| $S_{14}$ | 2.25 | 42 |
| $S_{15}$ | 1.5 | 45 |
| $S_{16}$ | 1.0 | 48 |

However it may be achieved, the scale factor relating the sinusoidal input to the neural analyzer at $t_1$ to responses at $1T_1$–$1T_{16}$ at the particular frequency of maximum response increases logarithmically (in equal ratios) according to the schedule in the foregoing table. In general, the increase in scale factor is proportional to the reduction in bandwidth, there being approximately a 6 db increase for each halving of the bandwidth. For the case of bandwidth decreasing in half octave intervals, the scale factors thus increase in 3 db steps. The purpose of the system of rectifiers $R_1'$–$R_{16}'$ is to convert fluctuations to monopolar form, and this may be achieved in connection with the differentiators $D_1$–$D_{16}$ in a manner to be described hereinafter. Low-pass filters $F_1'$–$F_{16}'$ limit response speeds to those consistent with the human nervous system and as such all have the same bandwidth of about 2 cycles per second, which is also equivalent to a simple resistor-capacitor filter having a time constant of 80 milliseconds.

Figure 3:
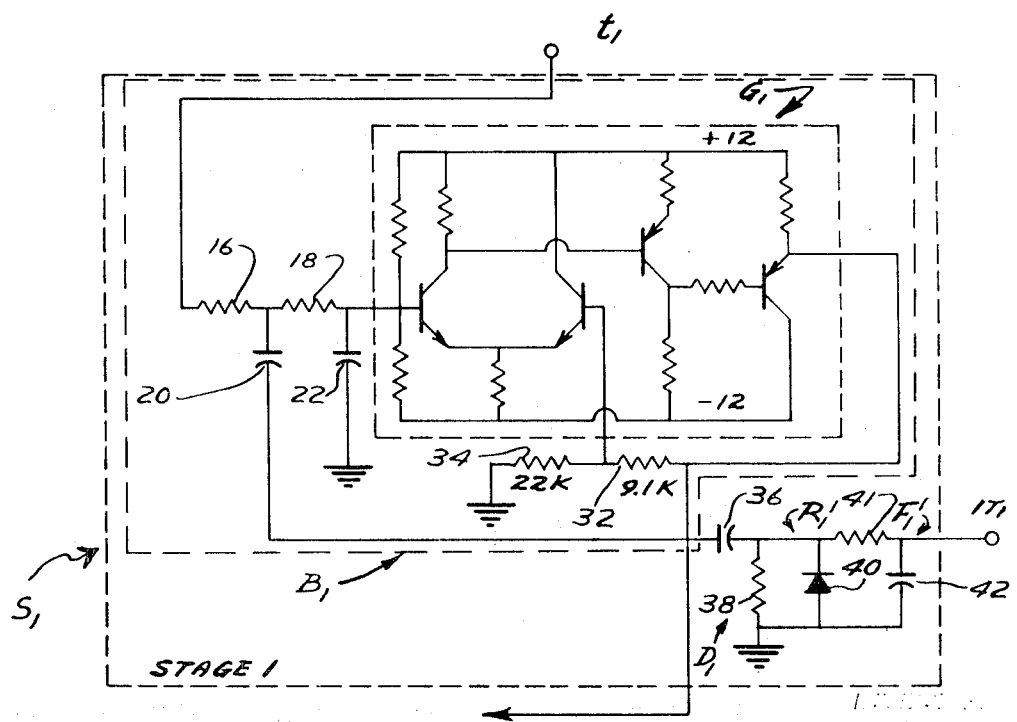
FIGURE 3 is a schematic or diagrammatic representation of one of the sections of the neural analyzer shown in FIGURE 2.

It should be understood without difficulty that a variety of specific kinds of amplifiers and other circuits can be employed to effect operations according to the plans set forth herein. For illustrative purposes only, one such circuit is shown in FIGURE 3, which represents stage $S_1$ in FIGURE 2. A differential amplifier $G_1$ of the analog computer type is caused to have 3 db gain and a resistance-capacitance network is placed about its non-inverting input/output terminals so as to achieve a low-pass filter $B_1$, of the active kind, bandwidth being determined by the values of the elements in the feedback network. FIGURE 3 shows the specific circuit in which resistors 32 and 34 yield the desired gain and elements 16, 18, 20 and 22 comprise the resistance-capacitance feedback network. The basic amplifier $G_1$ is of a standard kind not requiring further elaboration.

The amplified output from the amplifier $G_1$ is fed to a differentiating network $D_1$ comprised of a capacitor 36 and a resistor 38, a diode 40 to shunt or parallel with the resistor 38 performing the function of rectifier $R_1'$ of FIGURE 2. Each stage $S_1$–$S_{16}$ has a differentiating network such as $D_1$ which is identical with each other and is driven from the voltage from the amplifier for each stage. For a waveform that goes positive from zero, the diode 40 is, of course, inoperative, but for negative going signals, the diode acts as a short circuit to quickly cause the response to fall to zero. Due to the rectifying action of the diode 40, the neural analyzer $A_1$ has only positive output signals at the various terminals $1T_1$–$1T_{16}$.

Finally, the response from the nonlinear differentiator is subjected to low-pass filtering in filter $F_1'$ comprised of a resistor 41 and a capacitor 42, these elements being selected to provide a time constant of approximately 80 milliseconds, with resistor 41 being sufficiently large so as not to make its presence unduly felt in the operation of differentiator $D_1$.

A fairly elementary modification of the system described in FIGURE 3 can be made such that the scale factors arise in the differentiator sections rather than in the cascade of low-pass filters $B_1$–$B_{16}$. This results in better stability and reliability of the amplifiers in the system, as well as larger dynamic range. The modification is to increase the time constant of the differentiator network elements 36 and 38 as the bandwidths decrease. This permits the amplifier gain to be reduced to substantially unity, which can be done by deleting resistor 3A. Appropriate modifications in the values of the network composed of elements 16, 18, 20 and 22 are then also necessary in order to maintain the low pass bandwidth function unchanged. The following table gives the relative values of the differentiator network time constants.

TABLE II

| Stage No.: | Time constant (msec.) |
| --- | --- |
| $S_1$ | 0.33 |
| $S_2$ | 0.5 |
| $S_3$ | 0.744 |
| $S_4$ | 1.12 |
| $S_5$ | 1.68 |
| $S_6$ | 2.52 |
| $S_7$ | 3.78 |
| $S_8$ | 4.7 |
| $S_9$ | 8.55 |
| $S_{10}$ | 12.7 |
| $S_{11}$ | 19.1 |
| $S_{12}$ | 28.7 |
| $S_{13}$ | 43. |
| $S_{14}$ | 64.5 |
| $S_{15}$ | 100. |
| $S_{16}$ | 145. |

What has occurred up to this point is that the neutral analyzer has converted the slope, that is, the time rate of change, of the envelope function of the neural signal at the point or response station of the cochlea 14 into a slowly changing derivative signal that can be further processed as described below.

Before describing the processing of the signals from the terminals $1T_1$–$1T_{16}$, it perhaps should be explained that while the remaining analyzers $A_2$–$A_{10}$ can be identical to the analyzer $A_1$, the same number of stages or filter sections as described in conjunction with the description of the analyzer $A_1$ is not necessary for the reason that the frequency of the signals as taken from the cochlea 14 as the waveforms move to the right end are lower than those taken from the response stations toward the left. Consequently, the number of filter sections can be correspondingly reduced. For example, possibly only 10 such stages or filter sections might be utilized as far as the analyzer $A_{10}$ is concerned. State somewhat differently, the bandwidths set forth the stages $S_7$–$S_{16}$ would suffice.

Returning to FIGURE 1 and the neural analyzer $A_1$, the 16 outputs from this analyzer are directed into a cable labeled 44 which transmits the individual signals to a commutator $C_1$, which as explained in Patent No. 3,294,909, can be a mercury jet commutator that has been marketed as Deltaswitch Model 210 manufactured by Advanced Technology Laboratories, a division of American-Standard. The purpose of the commutator is to permit sequential sampling of the outputs of the analyzer. The commutated signals, in the illustrative situation, are fed to a cathode ray tube oscilloscope $O_1$. There is a commutator associated with each analyzer and having assumed that there would be 10 analyzers, there would be additional commutators $C_2-C_{10}$ and oscilloscopes $O_2-O_{10}$ therefor.

Having presented the foregoing information, it will be appreciated that each oscilloscope $O_1-O_{10}$ presents a space-time pattern as far as the signals are concerned which are obtained from the particular neural analyzer $A_1-A_{10}$ with which such oscilloscope is associated. In other words, each neural signal at a point along the cochlea 14 is converted into a space-time pattern that can be carefully studied on the particular oscilloscope. Thus, while in effect a phonetic-like display is derived from the speech processed by the arrangement shown in FIGURE 1, the display changing at a very slow rate which allows a direct and graphic distinction to be made between consonants, liquids and other sounds, the signals obtained from the neural analyzers $A_1-A_{10}$ of FIGURE 1 can also be processed in other ways. Having obtained a speech bandwidth compression in this manner, specific patterns can be employed to operate various types of circuits; for example, the outputs can be utilized in connection with a speech-to-machine transformation as already indicated.

Since the pattern changes in the form of the signals from any one of the neural analyzers change no faster than do Braille symobls presented at a normal speech rate, the utilization of such signals in the form of speech via the sense of touch can be realized.

Although the invention has been shown and described in conjunction with an animal cochlea, more specifically, an electronic simulation thereof, it will be appreciated that a single neural analyzer, such as the analyzer $A_1$, can be employed in certain instances. A single neural analyzer could be used in the study of the auditory systems of various insects, such as a grasshopper or cricket or simple vertebrates such as fish. Such a system as depicted in its more simplified form, for example when using only a single analyzer, may provide an extensive analysis for studying the vibration sensing capabilities of animals, such as spiders and snakes. Consequently, the complexity of the system actually depicted in FIGURE 1 can be simplified for certain practical applications. On the other hand, the system can be made even more complex, such as utilizing the outputs obtained at the terminals $t_1-t_{10}$ (or some of such terminals) and by means of suitable amplification a set of signals can be derived which can be used in conjunction with the signals obtained at the terminals $1T_1-1T_{16}$ of the analyzer $A_1$ and the corresponding terminals $2T_1-2T_{16}$ of, say, the analyzer $A_2$. Thus, considerable versatility is made possible when practicing the teachings of the instant invention.

Figure 4:
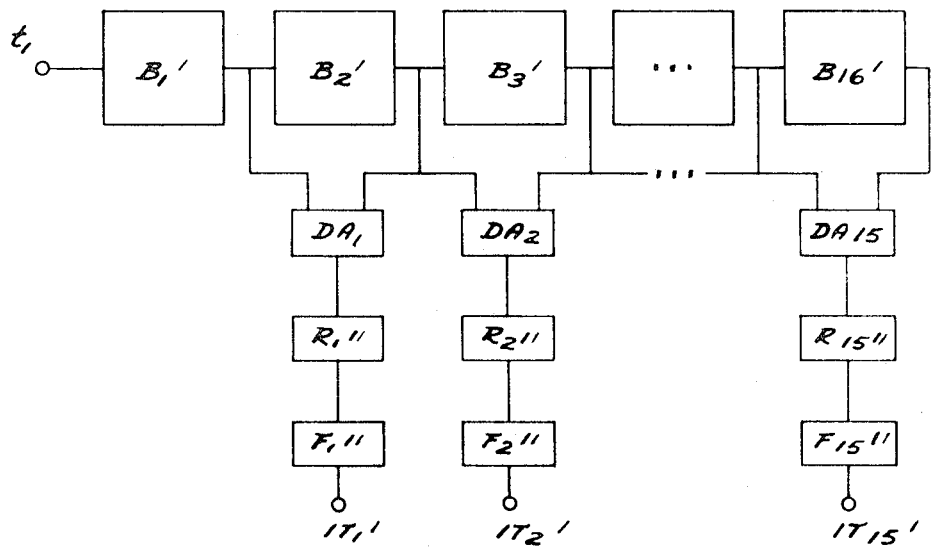
FIGURE 4 shows an alternative scheme in which the acquisition of a difference signal performs approximately as the differentiator in FIGURE 2.

Another system suitable for neural analyzer $A_1$ is illustrated in FIGURE 4, although it will be observed that one less output terminal is involved here than in the FIGURE 2 embodiment. In this arrangement, there is again a cascade of low pass filters, $B_1'$ to $B_{16}'$, having the same bandwidths as the corresponding filters in the FIGURE 2 embodiment, but in this case all scale factors are unity such that a constant input signal appears the same everywhere along the cascade.

Differential mechanisms $DA_1-DA_{15}$ are provided for taking the magnitude of the difference between adjacent pairs of filters $B_2'-B_{16}'$, differential mechanisms $DA_1-DA_{15}$ each being connected to the respective outputs of adjacent filters as shown. Each difference signal thus obtained is then rectified in rectifiers $R_1''-R_{15}''$ and filtered with a low pass filter, $F_1''-F_1''$ respectively, each filter having a time constant of approximately 80 milliseconds. As can be demonstrated mathematically, the outputs appearing at the terminals $1T_1'-1T_{15}'$ of this system are similar, although not identical, to those appearing at terminals $1T_1-1T_{16}$ in FIGURE 2.

It will, of course, be understood that various changes may be made in the form, details, arrangements and proportions of the parts without departing from the scope of my invention as set forth in the appended claims.

I claim:

1. A neural-like analyzing system comprising means for supplying a time-varying electrical signal, a plurality of low-pass filter sections connected in cascade, the first of said filter sections being connected to said supply means, said filter sections successively decreasing in bandwidth from the first to the last filter section, each said filter section including an amplifier that constitutes scale factor means associated with each of said filter sections for successively increasing the outputs from the first to the last of said filter sections, means connected to said filter sections for providing a plurality of response signals, each response signal being substantially proportional to the time rate of change of the output of the corresponding filter section, and means connected to said last-mentioned means for processing said response signals.

2. An analyzing system in accordance with claim 1 in which said processing means includes a commutator in circuit with said response signal providing means and an oscilloscope connected to said commutator for displaying said response signals in a space-time relation.

3. An analyzing system in accordance with claim 1 in which bandwidth decrease is in equal ratios from filter section to filter section and in which scale factor increase is in equal ratios from filter section to filter section.

4. An analyzing system in accordance with claim 3 in which said bandwidth decrease is by half octaves from filter section to filter section and in which said scale factor increase is three decibels per filter section.

5. An anlyzing system in accordance with claim 3 in which said response signal providing means comprises a plurality of differentiating networks each connected to the output of one of said filter sections.

6. An anlyzing system in accordance with claim 5 in which said processing means includes means for limiting the output of each differentiating network to a single polarity.

7. An analyzing system in accordance with claim 3 in which said supply means includes an electronic analog ear having a series of frequency resonant circuits each of which has a unique resonant frequency less than the resonant frequencies of preceding resonant circuits so as to form response stations that correspond to neural positions along the cochlea, there being a plurality of said filter sections for each of said response stations for analying the outputs thereof.

8. An analyzing system in accordance with claim 7 in which said processing means includes a commutator for each plurality of filter sections which is in circuit with the response signal providing means for those particular filter sections, said processing means further including an oscilloscope connected to each commutator for displaying said response signals in space-time relation.

References Cited

UNITED STATES PATENTS 3,387,093 6/1968 Stewart _____ 179—15.55
3,325,597 6/1967 Stewart.
3,294,909 12/1966 Caldwell.

KATHLEEN H. CLAFFY, Primary Examiner

C. JIRAUCH, Assistant Examiner

U.S. Cl. X.R.
179—15.55; 324—77